United States Patent
Shi et al.

(10) Patent No.: US 10,151,662 B2
(45) Date of Patent: Dec. 11, 2018

(54) METHOD AND APPARATUS FOR ASSESSING TREATMENT EFFECTIVENESS OF TOOTH SENSITIVITY WITH AN ORAL CARE PRODUCT

(71) Applicant: The Procter & Gamble Company, Cincinnati, OH (US)

(72) Inventors: Yunming Shi, Beijing (CN); Lei Tian, Beijing (CN); Ross Strand, Singapore (SG); Donald James White, Jr., Fairfield, OH (US); Nixon Lao Ocampochua, Beijing (CN); Jinlan Chang, Beijing (CN); Yanyan He, Beijing (CN); Tao He, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 146 days.

(21) Appl. No.: 14/687,942

(22) Filed: Apr. 16, 2015

(65) Prior Publication Data
US 2016/0202137 A1 Jul. 14, 2016

(30) Foreign Application Priority Data

Jan. 13, 2015 (CN) ............... 2015/070609

(51) Int. Cl.
*G09B 23/30* (2006.01)
*G01M 3/16* (2006.01)
(Continued)

(52) U.S. Cl.
CPC ............ *G01M 3/16* (2013.01); *G09B 23/283* (2013.01); *G09B 23/30* (2013.01); *G09B 23/32* (2013.01)

(58) Field of Classification Search
CPC .................................................. G09B 23/283
See application file for complete search history.

(56) References Cited

U.S. PATENT DOCUMENTS 6,969,258 B1  11/2005  Farzad
9,087,457 B2   7/2015  Drake et al.
(Continued)

FOREIGN PATENT DOCUMENTS

| CN | 102227203 A | 10/2011 |
| CN | 103120623 | 5/2013 |
| WO | WO2010071533 A1 | 6/2010 |

OTHER PUBLICATIONS

Pillai et al, WO2015/053754, Apr. 16, 2015.*
(Continued)

*Primary Examiner* — Lisa Caputo
*Assistant Examiner* — Alex Devito
(74) *Attorney, Agent, or Firm* — Parker D. McCrary; Amanda T. Barry; Alexandra S. Anoff

(57) ABSTRACT

An apparatus (40) for assessing treatment effectiveness of tooth sensitivity with an oral care product comprising a tooth shaped member (50) comprises an outer layer (60) simulating an enamel, wherein the outer layer (60) at least partially covers an exterior surface of an inner layer (70) simulating a pulp, and a liquid sensor (80) contained either between the outer layer (60) and inner layer (70), or within the inner layer (70); and a plurality of holes (90), simulating open dentin tubules, configured through the outer layer (60) to the inner layer (70), and in fluid communication with the liquid sensor (80); wherein the liquid sensor (80) is configured to sense liquid passing through at least one of the plurality of holes (90) as simulating the treatment effectiveness of tooth sensitivity of the oral care product.

19 Claims, 5 Drawing Sheets

(51) Int. Cl.
  *G09B 23/32* (2006.01)
  *G09B 23/28* (2006.01)

(56) References Cited

U.S. PATENT DOCUMENTS

| | | |
|---|---|---|
| 2001/0044092 A1 | 11/2001 | Raffeiner |
| 2007/0054243 A1 | 3/2007 | Schemmer et al. |
| 2010/0000533 A1 | 1/2010 | Schmid et al. |

OTHER PUBLICATIONS

Pro-Argin Technology Mode of Action video downloaded at http://www.colgateprofessional.com/professional-education/videos/pro-argin-technology-mode-of-action ; downloaded Mar. 31, 2015.
Addy, "Dentine Hypersensitivity: New Perspectives on an Old Problem", International Dental Journal, vol. 52, pp. 367-375, 2002.
Written Opinion for PCT/CN2015/070609 dated Jan. 13, 2015.
International Search Report for PCT/CN2015/070609 dated Jan. 13, 2015.
International Search Report for (PCT/CN2015/070609) dated Mar. 10, 2017.

\* cited by examiner

METHOD AND APPARATUS FOR ASSESSING TREATMENT EFFECTIVENESS OF TOOTH SENSITIVITY WITH AN ORAL CARE PRODUCT

CROSS REFERENCE TO RELATED APPLICATION

This Application claims the benefit of Application No. CN 2015/070609 filed Jan. 13, 2015.

FIELD OF THE INVENTION

The invention is directed to a method and apparatus for assessing treatment effectiveness of tooth sensitivity, preferably dentin hypersensitivity, with an oral care product.

BACKGROUND OF THE INVENTION

FIG. 1 shows a cross-sectional view of a conventional human tooth. The tooth consists of enamel (10), dentin (20), and pulp cavity (30), which are arranged in an inward order. Dentin (20) comprises hydroxyapatite and has a number of fine canals called dentin tubules (21) which connects the enamel (10) to the pulp cavity (30). The dentin tubules (21) are generally about two microns in diameter at their base and somewhat narrower at their periphery. Pulp cavity (30) has therein a nerve (31), blood vessels and lymphatic vessels. Dentin hypersensitivity (or also known as dentin sensitivity) is a common and uncomfortable condition caused by erosion of the enamel (10) exposing the hollow dentin tubules (21) thereby allowing external stimuli, such as for example, heat, cold, chemicals and physical and mechanical pressure or stimuli such as brushing to be able to irritate the nerves (31) through the open dentin tubules (21) resulting in pain sensation.

Some reports have dentin hypersensitivity affects up to 57% of patients worldwide (Addy M., *Int. Dent. J.*, 2002: 52, 367-375). Due to its high prevalence rate, the oral care industry has developed oral care products for treating this condition. Common approaches to communicate the treatment effectiveness of these products, whether via live in-store presentation, on-line, print advertisement or television copy, rely on the use of demonstration tools such as for example animated videos (see, http://www.colgateprofessional.com/professional-education/videos/pro-argin-technology-mode-of-action) or magnified illustrations (FIG. 2). However, there are a number of challenges with these tools. Consumers tend to regard videos and images with skepticism because of the perception that they are not real-time and vivid representation of what is occurring, and therefore might have been visually enhanced to unfairly favor one product over the competition. Moreover, blown-up images are bulky and require a lot of space for display. They are also difficult to transport and are prone to being damaged during transport. Lastly, while animated videos might be able to show mode of action they cannot be readily used to measure and/or demonstrate treatment efficacy of products.

Accordingly, the need exists for an improved method and apparatus for assessing the treatment effectiveness of tooth sensitivity, preferably dentin hypersensitivity, with an oral care product. It is advantageous that the method and apparatus are easily transportable to various sites to be used in demonstrations to consumers. It is also advantageous that the method and apparatus are predictive of clinical effectiveness for treatment of tooth sensitivity. It is further advantageous that the method and apparatus of the present invention can be used as a quick screening tool for dentin hypersensitivity actives.

SUMMARY OF THE INVENTION

In a first aspect, the present invention is directed to an apparatus for assessing treatment effectiveness of tooth sensitivity, preferably dentin hypersensitivity, with an oral care product comprising:
(a) a tooth shaped member comprising an outer layer simulating an enamel, wherein the outer layer at least partially covering an exterior surface of an inner layer simulating a pulp, and a liquid sensor contained either between the outer layer and inner layer, or within the inner layer; and
(b) a plurality of holes, simulating open dentin tubules, configured through the outer layer to the inner layer, and in fluid communication with the liquid sensor; wherein the liquid sensor is configured to sense liquid passing through at least one of the plurality of holes as simulating the treatment effectiveness of tooth sensitivity of the oral care product.

In another aspect, the invention provides for a method of assessing whether an oral care product is an effective treatment of tooth sensitivity, preferably dentin hypersensitivity, comprising the steps of:
(a) providing an apparatus as set forth above, and an indicator in communication with the sensor of the provided apparatus;
(b) covering the plurality of holes of the provided apparatus with the oral care product;
(c) placing a liquid over the covered holes; and
(d) assessing whether the placed liquid penetrates the covered holes by observing, preferably by observing over a pre-determined period of time, whether the indicator indicates liquid penetration, wherein a lack of liquid penetration for the oral care product is a positive assessment of the oral care product's effective treatment of tooth sensitivity.

In another aspect, the invention provides for a kit for providing to a consumer an assessment of treatment effectiveness of tooth sensitivity, preferably dentin hypersensitivity, with an oral care product comprising the apparatus, as set forth above; and optionally user instructions.

These and other features of the present invention will become apparent to one skilled in the art upon review of the following detailed description when taken in conjunction with the appended claims.

BRIEF DESCRIPTION OF THE DRAWINGS

While the specification concludes with claims particularly pointing out and distinctly claiming the invention, it is believed that the invention will be better understood from the following description of the accompanying figures in which like reference numerals identify like elements, and wherein:

FIG. 4A shows the apparatus (40) in the off or resting mode, whereas FIG. 4B shows the apparatus (40) in the on or activated mode.

DETAILED DESCRIPTION OF THE INVENTION

Figure 1:
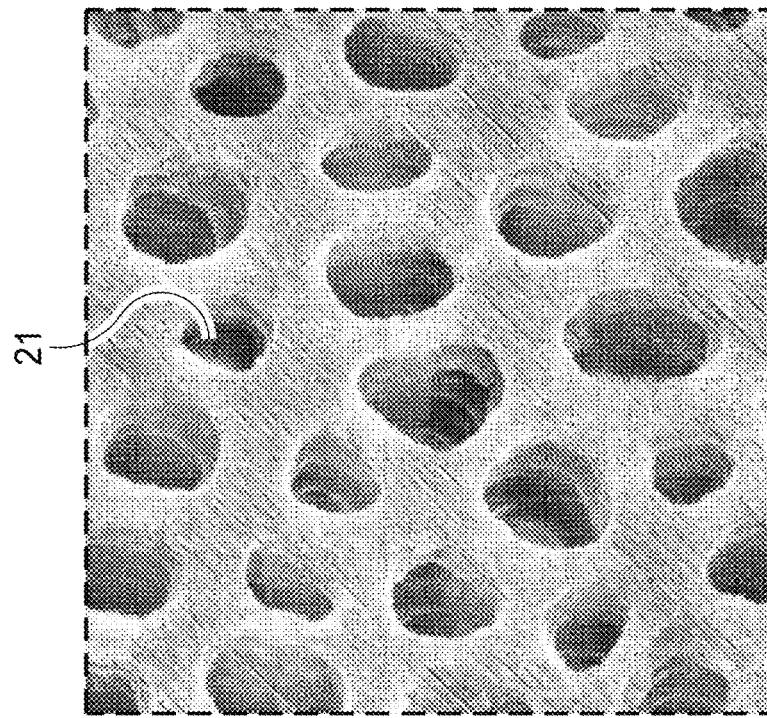
FIG. 1 shows a cross-sectional view of a conventional human tooth and an enlarged view of part of the surface of the tooth.
Figure 1:
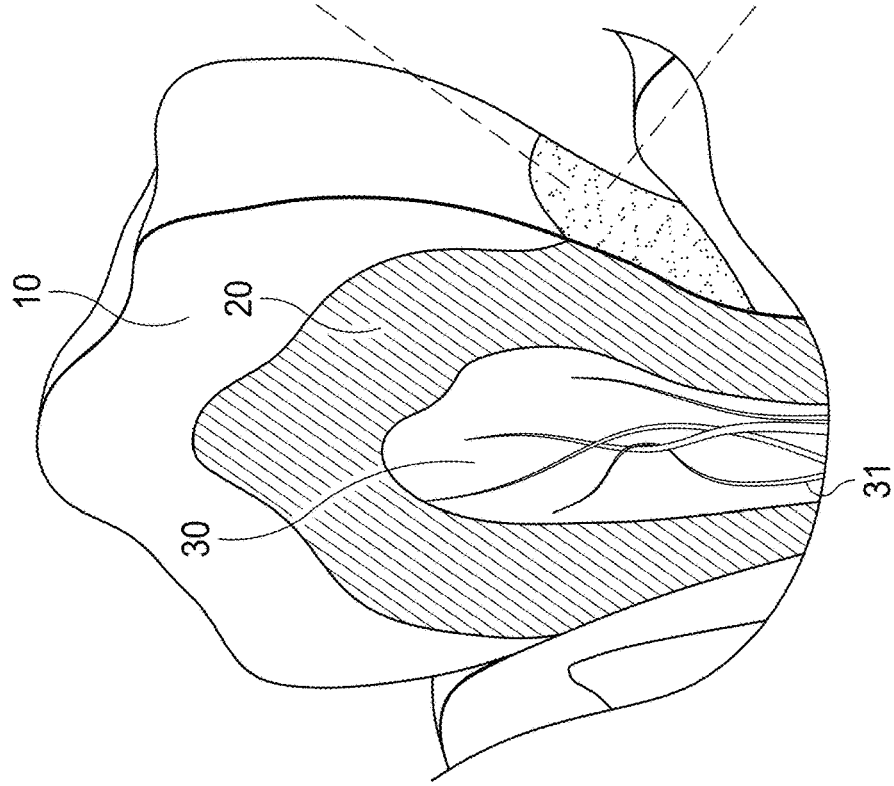
Figure 2:
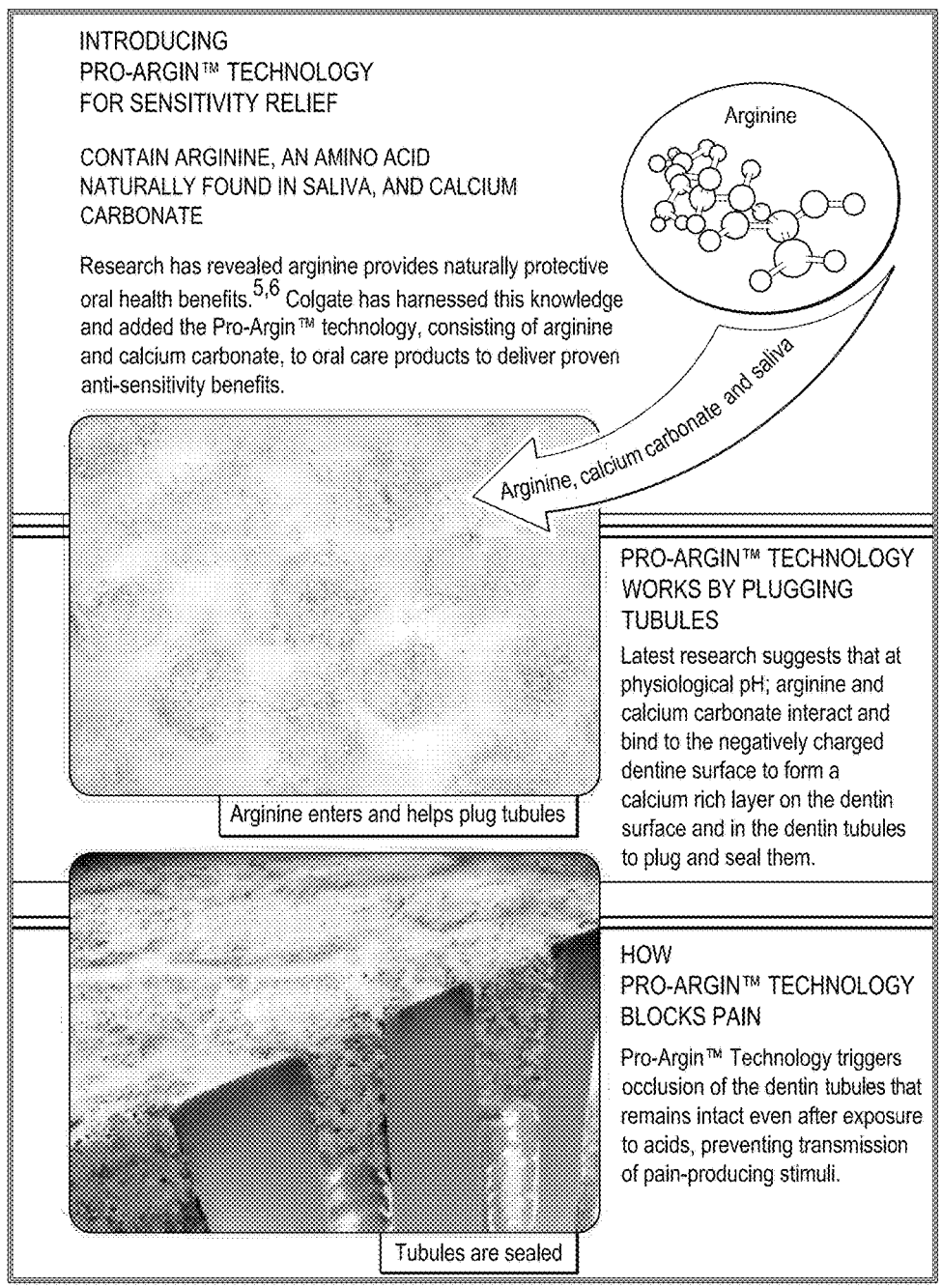
FIG. 2 shows a prior art advertisement using computer-illustrated SEM micrograph taken of a dentin specimen after use with a conventional de-sensitizing toothpaste.

It is to be understood that the scope of the claims is not limited to the specific devices, apparatuses, methods, conditions or parameters described and/or shown herein, and that the terminology used herein is for the purpose of describing particular embodiments by way of example only and is not intended to be limiting to the claimed invention. Also, as used in the specification including the appended claims, the singular forms "a", "an", and "the" include the plural.

As used herein, the term "about" when placed before a numerical value "X" refers to an interval extending from 10% of X, preferably 5% of X, and even more preferably to an interval extending from 2% of X.

As used herein, any of the terms "comprising", "having", "containing", and "including" means that other steps, ingredients, elements, etc. which do not adversely affect the end result can be added. Each of these terms encompasses the terms "consisting of" and "consisting essentially of". Unless otherwise specifically stated, the elements and/or equipment herein are believed to be widely available from multiple suppliers and sources around the world.

As used herein, the term "consumers" is meant to include the customers who purchase the product, users of the products, or the store owners or managers who decide whether to stock their shelves with the product.

As used herein, the term "control" means a sample not incorporating the candidate oral care product of interest. Suitable controls include a positive control provided by a known de-sensitizing oral care product and a negative control such as inert compounds (i.e., compounds known not to affect tooth sensitivity) or no compounds at all being used.

As used herein, the term "oral care product" is meant a product, which in the ordinary course of usage, is not intentionally swallowed for purposes of systemic administration of particular therapeutic agents, but is rather retained in the oral cavity for a time sufficient to contact substantially all of the dental surfaces (i.e., tooth) and/or oral tissues for treatment of tooth sensitivity. The oral care product may be in various forms including toothpaste, dentifrice, tooth gel, subgingival gel, mouth rinse, mousse, foam or denture product. The term "oral care product" may also include treatment regimens where these aforementioned compositions may be applied to teeth via an implement, such as a toothbrush or the like. Suitable examples of dentifrice can be found in U.S. Patent Publication No. US 2011/239736 A1. The term "oral care product" may also include individual oral care actives.

Apparatus

Typically, tooth sensitivity occurs as a result of pain sensation in the pulp cavity. The inventors have discovered that treatment effectiveness for tooth sensitivity by oral care products can be readily assessed by the demonstration tool of the present invention. It has importantly been found that the present invention is an effective communication tool that provides an easier way to understand tooth sensitivity and its prevention/alleviation by use of an oral care product for a quick "a-ha" moment by the consumer without requiring a professional background and/or a lot of explanation, yet still be clinically meaningful enough to be accepted by professionals (e.g., dentists). The apparatus (40) works by the inward flow of a liquid simulating an external stimuli into holes simulating dentin tubules in an apparatus (40) simulating a human tooth resulting in a visual change (e.g., lights flashing) used to mimic nerve excitation, an auditory change (e.g., pain sounds such as "ouch") used to reflect the consumer's pain response, and/or an odor change (e.g., burnt smell) used to connect pain or off-putting smell.

Accordingly, the present invention is directed to an apparatus (40) for assessing treatment effectiveness of tooth sensitivity, preferably dentin hypersensitivity, with an oral care product. The present invention can also be useful to demonstrate treatment effectiveness of an oral care product for other types of dental conditions or diseases such as enamel erosion, gingival recession (i.e., gum recession), chronic periodontitis (i.e., gum disease), acid erosion (e.g., related to gastroesophageal reflux disease, bulimia or excessive consumption of acidic foods and drinks), cervical tooth wear, tooth attrition (i.e., from bruxism) and the like.

Figure 3A:
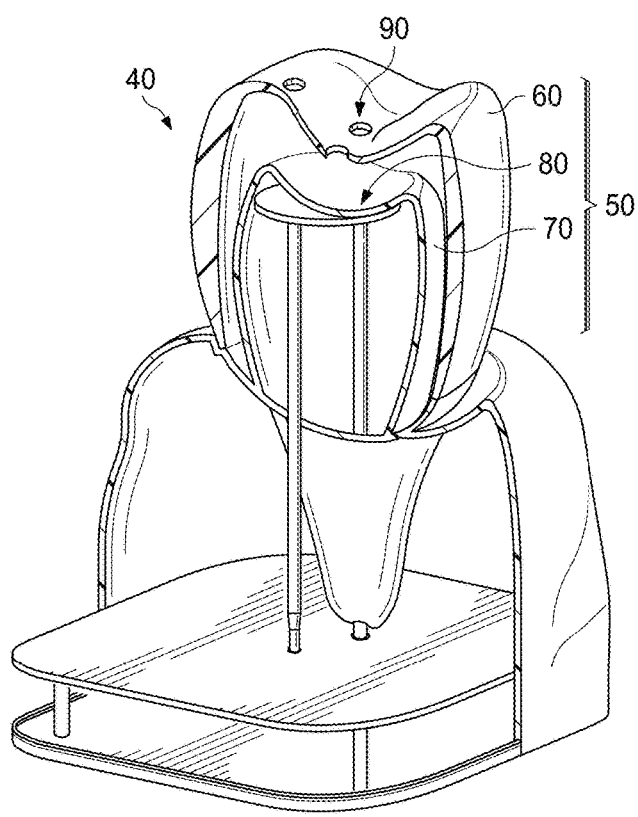
FIG. 3A shows a cross-sectional view of an embodiment of the apparatus (40) according to the present invention.

With reference to FIG. 3A, in one embodiment, the apparatus (40) comprises a tooth shaped member (50) comprising an outer layer (60) simulating an enamel. The outer layer (60) at least partially covering an exterior surface of an inner layer (70) simulating a pulp cavity. The empty space between the outer layer (60) and the inner layer (70) simulates a dentin. There is a liquid sensor (80) contained between the outer layer (60) and the inner layer (70), or, alternatively, as depicted in FIG. 3A, the liquid sensor (80) is positioned within the inner layer (70). A plurality of holes (90) simulating openings of dentin tubules is configured through the outer layer (60) to the inner layer (70) and in fluid communication with the liquid sensor (80). The liquid sensor (80) is configured to sense liquid passing through at least one of the plurality of holes (90) as simulating the treatment effectiveness of tooth sensitivity of the oral care product.

The apparatus (40) can be of any dimensions so long as it is portable enough to be relatively easily transported to different sites and conveniently fits into available display space. For example, referring to the embodiment illustrated in FIG. 3A, the length×width×height dimensions of the apparatus (40) are 20 cm×15 cm×22 cm. Other embodiments are contemplated, such that the dimensions can be as small as, for example, 10 cm×7.5 cm×10 cm. The smaller size is advantageous for travelling, particularly air travel, where luggage space is limited and the cost for additional cargo space is expensive. Such a smaller size would also be beneficial for dentist offices where available space is also limited. The apparatus (40) can be manufactured to be easily disassembled and re-assembled upon arrival to the site for ease of transport.

Referring to FIG. 3A, an embodiment of the present invention relates to an apparatus (40) having a tooth-like appearance. However, other appearances can be used herein, such as a mouth-like appearance, a product-like appearance, a case-like appearance, castle-like appearance, fort-like appearance, or the like. The apparatus (40) can be made from any materials which can be molded or shaped, while still being durable enough to hold up to being transported around without easily breaking down. Non-limiting examples include plastic, steel, wood, and combinations thereof. Preferably, the materials are hard plastics such as polycarbonate, polyethylene (PE), polypropylene (PP), polyvinylchloride (PVC), polyethylene terephthalate (PET), or the like. Further, the apparatus (40) can be made of stain-proof materials, which makes it easy to clean after each use.

Figure 4A:
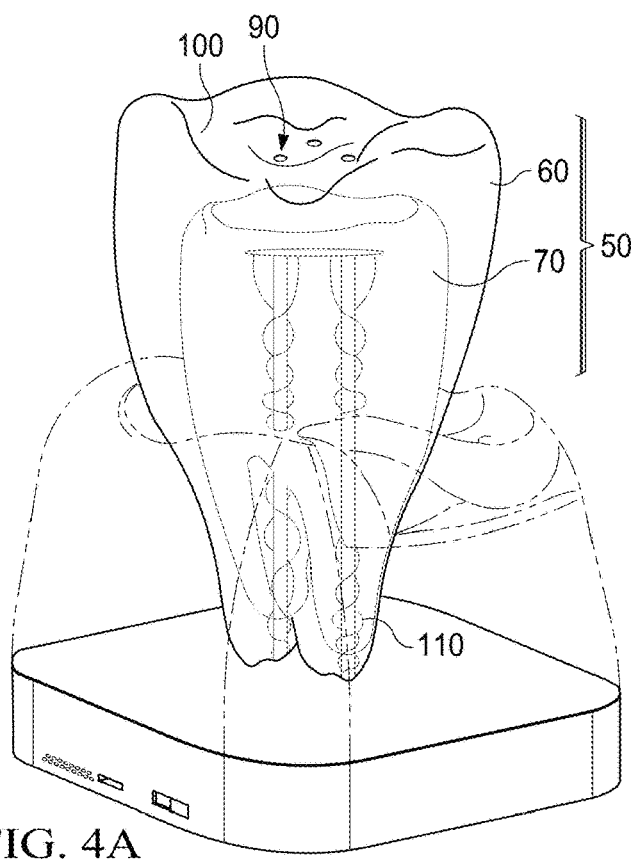
FIGS. 4A & 4B show perspective views of an embodiment of the apparatus according to the present invention.

With reference to FIG. 4A, in a preferred embodiment, wherein a portion of the tooth shaped member (50) is translucent or transparent, preferably at least a portion of the outer layer (60) and/or alternatively at least a portion of the inner layer (70). Alternatively, in another embodiment (not shown) just the front half of the outer layer (60) and/or inner layer (70) may be translucent or transparent, while the back half of the outer layer (60) and/or is opaque or non-transparent. With these arrangements, any visual changes that occur inside the apparatus (40) can be easily viewed by the consumers. Further, the tooth shaped member (50) can be completely or partially opaque for those executions where the liquid sensor (80) is configured to give a non-visual signal (e.g., auditory signal, a change in odor, etc).

The external surface of the tooth shaped member (50) may have an optional mark, such as a product logo, linking the apparatus (40) to the oral care product to be demonstrated. Other marks, such as pattern, a character, a logo, a word, a letter, a claim, a slogan, a picture, a photo or a combination thereof, which can be used to make the apparatus (40) appear more appealing to the consumers and/or communicate to the consumers some related information, such as new benefits.

Figure 3B:
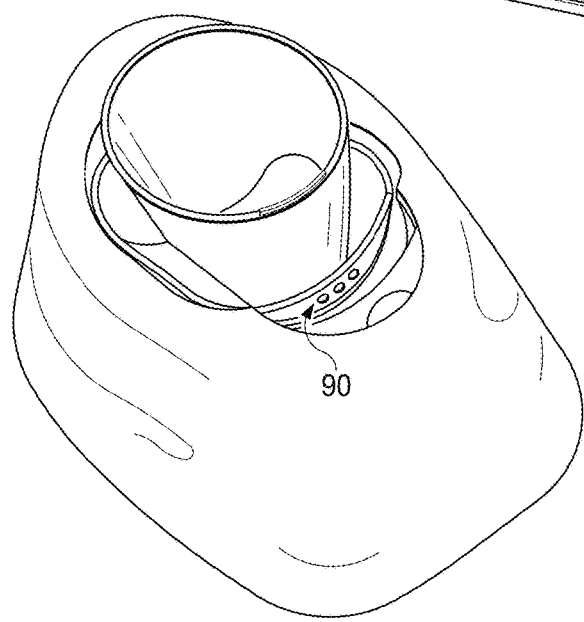
FIG. 3B shows a perspective view of an embodiment of the apparatus (40) according to the present invention.
Figure 4B:
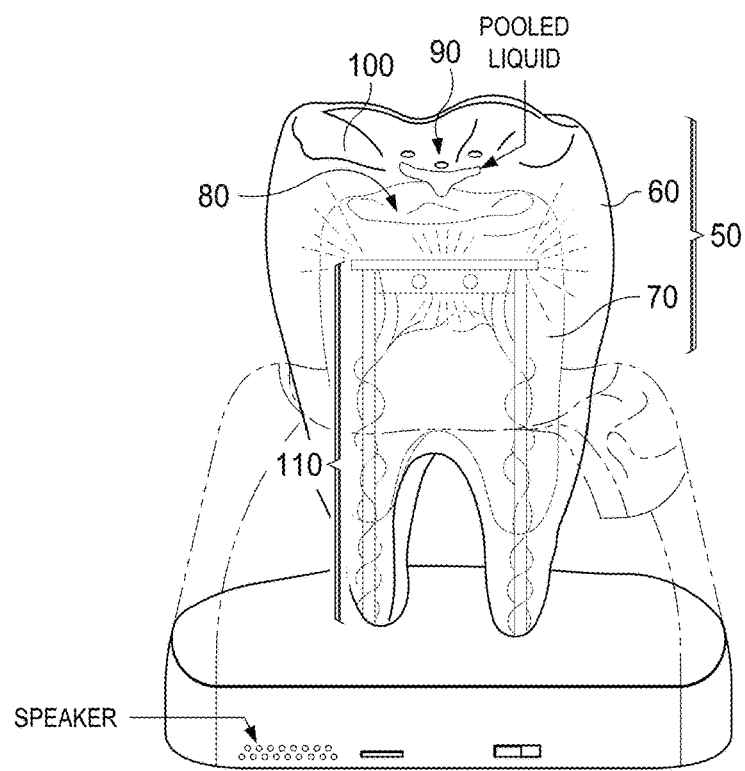

According to FIG. 4B, in an embodiment, the plurality of holes (90) can be evenly spaced around the top of the outer layer (60). In a preferred embodiment, the plurality of holes (90) are substantially perpendicular relative to the ground where the apparatus (40) is resting. In another preferred embodiment, the plurality of holes (90) are positioned in a concave surface (100) formed on the outer layer (60) of the tooth shaped membrane (50). Alternatively, with reference to FIG. 3B, in an embodiment, the plurality of holes (90) can be positioned on the side of the outer layer (60). In a preferred embodiment, the plurality of holes (90) are positioned on the outer layer (60) near the point of contact with the simulated gum (120). This embodiment is particularly preferred as it simulates exposed dentin tubules due to gum recession. Alternatively, in an embodiment, the plurality of holes (90) can be positioned near the top and/or on the side of the outer layer (60).

With any of these arrangements, when in use, the liquid can pool on the concave surface (100, 101) and gravity can move the liquid through the holes (90) to trigger the liquid sensor (80). Alternatively, the liquid can have a colour, a detection material (e.g., fluorescing agent) or the like, whereby the consumers can readily view its movement through the holes (90) without requiring contact of the liquid with the liquid sensor (80).

The liquid that pools on the concave surface (100) can have a volume sufficient to dissolve the contents of the occluded holes (90) and/or complete the electrical circuit to activate the liquid sensor (80) (as described below). The volume of the liquid is preferably from about 2 mL to about 5 mL. For example, when the liquid pools and accumulates to a certain weight (e.g., 0.5 g or greater), then gravitational force due to the weight of the liquid and its acidic properties can cause the liquid to penetrate the occluded holes (90). The liquid acts as a conductive fluid to complete an electrical circuit to trigger the liquid sensor (80) and activate the indicator (110). The liquid may be selected from an acidic solution having a concentration of from 0.5 mol/L to 6.0 mol/L of $H^+$ ions, and a pH of about 7 or lower, preferably about 5 or lower, or more preferably about 4 or lower. Suitable examples of acidic solution for use with the apparatus (40) are selected from the group consisting of lactic acid, acetic acid, citric acid, phosphoric acid, tartaric acid, and combinations thereof.

The outer layer (60) of the tooth shaped member (60) includes at least one hole (90) disposed within it and through to the inner layer (70). Alternatively, there can be at least two, three, four, five, six, seven or as many holes (90) as needed, but only if it allows for sufficient spacing between each holes (90). Preferably, the tooth shaped member (60) includes three (3) to five (5) holes (90). Further, with reference to FIG. 3C, the inventors discovered that the diameter (D) of the holes (90) is important to the optimized performance of this demonstration tool. For example, the occluded holes (90) will collapse too fast upon challenge with the liquid if the diameters (D) of the holes are too big. Whereas with smaller diameters (D), the occluded holes (90) might be too compacted thus not allowing liquid through or requiring excessive time before the liquid can penetrate the holes (90), which is unacceptable. Preferably, the plurality of holes (90) has a diameter (D) of from about 0.5 mm to about 5 mm, preferably from about 1 mm to about 4 mm, or more preferably from about 2 mm to about 3 mm.

Figure 3C:
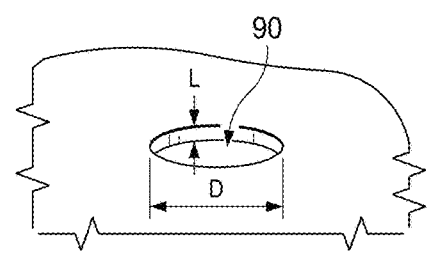
FIG. 3C shows a magnified view of a hole (90) of the apparatus (40) according to the present invention.

Similarly, with continued reference to FIG. 3C, the inventors have found that the thickness or length (L) of the holes (90) also has an impact on the elapsed time the liquid needs to travel to penetrate the occluded holes (90). For example, if the length (L) is too thick then too much time is needed before the liquid can penetrate the occluded holes (90). However, if the length (L) of the holes (90) is too thin then liquid penetration occurs too rapidly and the assessment results are not believed by the consumers. Preferably, the plurality of holes (90) have a length (L) of from about 0.5 mm to about 5 mm, preferably from about 1 mm to about 4 mm, or more preferably from about 2 mm to about 3 mm.

According to FIG. 4A, in an embodiment, the apparatus (40) contains a liquid sensor (80) which upon contact with the liquid emits an electrical signal to an indicator (110) (not shown), wherein the indicator (110) performs at least one of the following responses: visual change, auditory change, odor change or combinations thereof. For example, with reference to FIG. 4B, when in use the indicator (110) results in visual flashing, pain sounds and/or unpleasant odor. The source of the visual flashing can be a tungsten incandescent light bulb, a quartz halogen lamp, a UV lamp, a mercury vapor lamp, a light-emitting diode (LED) and the like. The pain sound can be a recorded voice of a person saying "ouch" or other similar words to indicate pain. The unpleasant odor can be a burning smell or a similarly off-putting odor indicative of pain.

In an embodiment, the liquid sensor (80) comprises of two separate metal pins when connected by a conductive liquid (e.g., acidic solution) forms a closed electrical circuit to turn on the indicator (110). If present, a battery is disposed within the apparatus (40) and configured to provide electrical power to the liquid sensor (80), as necessary, so that the apparatus (40) can be fully portable and operable at any location without needing an external power source. The battery may be a fixed charged battery that needs to be replaced from time-to-time or it can be rechargeable, such as for example, alkaline battery, NiCad battery, Lithium Ion battery or the like.

In another aspect, the present invention is directed to an apparatus (40) for assessing treatment effectiveness of tooth sensitivity, preferably dentin hypersensitivity, with an oral care product. The apparatus (40) comprising a tooth shaped member (50) comprising at least an outer layer (60) having an exterior surface and an opposing inner surface, and a plurality of holes (90) traversing through the outer layer (60) and simulating open dentin tubules. The apparatus (40) has a liquid sensor (80) on the inner surface is configured to sense liquid passing through at least one of the plurality of holes (90) for assessing the treatment effectiveness of tooth sensitivity with the oral care product.

Method of Use

In another aspect, the present invention is directed to a method of assessing whether an oral care product is an effective treatment of tooth sensitivity, preferably dentin hypersensitivity. The present invention is also directed to a method of assessing whether an oral care active is an effective treatment of tooth sensitivity, preferably dentin hypersensitivity. The effectiveness of the treatment may be assessed quantitatively by comparison of the elapsed time of protection against the penetration by the liquid challenge afforded by a first oral care product vs. a second oral care product. For example, where the oral care product is preferably a toothpaste, occlusion durability of the open dentin tubules can be assessed by measuring the time it takes the liquid to dissolve the toothpaste blocking the holes (90) in the apparatus (40).

Accordingly, the method according to the present invention, comprises the steps of:
(a) providing an apparatus (40) as set forth above, and an indicator (110) in communication with the sensor (80) of the provided apparatus;
(b) covering the plurality of holes (90) of the provided apparatus (40) with the oral care product;
(c) placing a liquid over the covered holes (90); and
(d) assessing whether the placed liquid penetrates the covered holes (90) by observing, preferably by observing over a pre-determined period of time for the oral care product, whether the indicator (110) indicates liquid penetration, wherein a lack of liquid penetration for the oral care product is a positive assessment of the oral care product.

The oral care product is a mouth wash, sensitivity strip, dentifrice or toothpaste, preferably a toothpaste. In an embodiment, the method further comprises the step (a-1) of mixing the oral care product with an enamel simulating composition before covering the holes, wherein the enamel simulating composition has a Mohs scale of mineral hardness of from about 2 to about 6 measured at 25° C. The Mohs scale of mineral hardness is known to the skilled person and characterizes the scratch resistance of various materials through the ability of a harder material to scratch a softer material. Non-limiting examples of suitable enamel simulating composition is selected from the group consisting of hydroxyapatite, $CaCO_3$, $CaSO_4$, $Ca_3(PO_4)^2$, $CaHPO_4$, $Ca(H_2PO_4)^2$ and combinations thereof. Preferably, the enamel simulating composition is hydroxyapatite.

In an embodiment, the method wherein the oral care product comprises oxalic acid and salts thereof, stannous fluoride, arginine (ProArgin), calcium sodium phosphosilicate (NovaMin), strontium chloride (hexahydrate), strontium acetate, calcium carbonate, hydroxyapatite or mixtures thereof.

In another aspect, the present invention is directed to a method of comparing a first oral care product and a second oral care product as effective treatment of tooth sensitivity, preferably dentin hypersensitivity, comprising the steps of:
(a) providing at least one apparatus (40) as set forth above, and at least one indicator (110) in communication with the sensor (80) of the provided apparatus (40);
(b) covering a first plurality of holes (91) of the provided apparatus (40) with the first oral care product;
(c) placing a first liquid over the first covered holes (91);
(d) assessing a first time period the first placed liquid penetrates the first covered holes (91) by observing when the indicator (110) indicates the first liquid penetration;
(e) covering a second plurality of holes (92) of the provided apparatus (40) with the second oral care product;
(f) placing a second liquid over the second covered holes (92);
(g) assessing a second time period the second placed liquid penetrates the second covered holes (92) by observing when the indicator (110) indicates the second liquid penetration; and
(h) comparing the first time period and the second time period, wherein a lower time period is indicative of higher treatment of tooth sensitivity.

In an embodiment, wherein the first oral care product or the second oral care product is a control.

In another embodiment of, wherein difference in the time period between the first oral care product and the second oral care product is greater than 2×, 4×, 8×, 10× or 20×.

The method may also comprise the steps of providing a third oral care product, a fourth oral care product, and so on for allowing the consumers to compare and assess the treatment effectiveness based on difference in elapsed time periods of penetration between multiple products.

The present invention also provides a kit for providing to a consumer an assessment of treatment effectiveness of tooth sensitivity, preferably dentin hypersensitivity, with an oral care product comprising the apparatus as set forth above. The kit may also include instructions for assembly and use of the apparatus for providing to a consumer an assessment of treatment effectiveness of tooth sensitivity.

EXAMPLE

In order that the present invention described herein may be more fully understood, the following examples are set forth. It should be understood that these examples are for illustrative purposes only and are not to be construed as limiting this invention in any manner.

Example 1—Assessment of Treatment Effectiveness of Oral Care Products

The demonstration tool of the present invention is being utilized to show the superior performance of Crest® Pro-Health toothpaste (Lot #21621864BA, a product from the Procter & Gamble Company, Guangzhou, China) versus a comparative product, Colgate® Sensitive Pro-Relief™ Pro-Argin toothpaste (Lot #3129TH11J1, a product from the Colgate-Palmolive Company, New York, N.Y.) for tooth sensitivity benefit based on assessment of the elapsed time for liquid penetration through the holes (90) of the apparatus (40). The following protocol is used:
1. Combine 5 g of a first toothpaste with 15 g of deionized water in a 50 mL centrifuge tube to form a 1:3 ratio toothpaste:water slurry. Use a bio-homogenizer to completely homogenize the mixture.
2. Centrifuge the tube at 10,000 rpm for 10 mins then discard the sediment.
3. Add 0.5 g hydroxyapatite powder (HAP) to the supernatant in the centrifuge tube from step 2, then vortex the tube for 1 min.
4. Centrifuge the tube at 10,000 rpm for 10 mins then discard the supernatant.
5. Invert the tube and air dry the resultant mixture for 12 hrs at room temperature.
6. Use cotton buds to fill the open holes (90) of the apparatus (40) with the resultant mixture. Ensure no visible gaps in the holes (90), and remove any excess mixture. Let the mixture air dry for 30 mins.
7. Use a plastic dropper to add 3 mL of a liquid (acidic solution as shown in Table 1) to completely cover the occluded holes. Avoid applying excessive pressure and disturbing the occluded holes (90).
8. Record the elapsed time required for the liquid to penetrate the occluded holes (90) as visible by the indicator (e.g., flashing light, sound or smell).
9. Repeat steps 1-8 for one or more additional toothpaste(s) (e.g., comparative product(s) and/or a control).

TABLE 1

Sample Liquids

| Liquid | Acid | pH | Concentration (mol/L of $H^+$ ions) |
| --- | --- | --- | --- |
| Liquid No. 1 | Lactic Acid | 5.5 | 0.5 |
| Liquid No. 2 | Lactic Acid | 5.5 | 1.0 |
| Liquid No. 3 | Citric Acid | 2.5 | 0.5 |
| Liquid No. 4 | Citric Acid | 2.5 | 1.0 |
| Liquid No. 5 | Phosphoric Acid | 4.0 | 0.5 |
| Liquid No. 6 | Phosphoric Acid | 4.0 | 1.0 |
| Liquid No. 7 | Acetic Acid | 3.2 | 0.5 |
| Liquid No. 8 | Acetic Acid | 3.2 | 1.0 |
| Liquid No. 9 | Acetic Acid | 3.2 | 2.0 |

Results

Elapsed time for liquid penetration are recorded and summarized in Table 2 below. Generally, the results show that both pH and concentration are important criteria. For example, lower pH and higher concentration acids (i.e., more acidic solutions) cause both toothpastes to dissolve quickly, whereas higher pH and lower concentration acids (i.e., less acidic solutions) result in slow dissolution of the toothpastes. The acetic acid containing solution (i.e., Liquid No. 8) having a pH around 3.2 and concentration of 1 mol/L tended to have the best performance with a relatively fast effect (~20 secs) and fairly dramatic difference (20× fold) between the two toothpastes.

TABLE 2

Elapsed Time for Treatment Effectiveness

| | Elapsed Time for Liquid Penetration | |
| --- | --- | --- |
| Liquid | Crest ® Pro-Health | Colgate ® Sensitive Pro-Relief ™ Pro-Argin |
| Liquid No. 1 | 60 mins | 10 mins |
| Liquid No. 2 | 30 mins | 7 mins |
| Liquid No. 3 | 1 min | 10 sec |
| Liquid No. 4 | 30 sec | 5 sec |
| Liquid No. 5 | 15 mins | 1 min |
| Liquid No. 6 | 10 mins | 40 sec |
| Liquid No. 7 | 9 mins | 30 sec |
| Liquid No. 8 | 7 mins | 20 sec |
| Liquid No. 9 | 2 mins | 8 sec |

Example 2—Tubule Occlusion Assay

Tubule Occlusion Brushing Assay (TUBA) is an in vitro assay used to measure tubule occlusion efficiency and acid resistance of different oral care products. In particular, TUBA assesses how many dentin tubules are re-opened after an acid challenge. Occlusion efficiency of dentin tubules by Crest® Pro-Health toothpaste (Lot #21621864BA, a product from the Procter & Gamble Company, Guangzhou, China) and Colgate® Sensitive Pro-Relief™ Pro-Argin toothpaste (Lot #3129TH11J1, a product from the Colgate-Palmolive Company, New York, N.Y.) are tested using TUBA. The TUBA results are then correlated to the results from the demonstration tool of the present invention from Example 1. TUBA involves the following steps for each sample:

1. Coronal dentin slab having a thickness of 0.8 mm (supplied by China-Japan Friendship Hospital, Beijing, China) are sanded with a 20 μm lapping paper for 120 secs and then sanded with a 9 μm lapping paper for 120 secs.
2. Slab is etched in 15 mL of a 6% citric acid solution for 1 min, then sonicated in deionized water for 3 minutes, and then placed in a 50 mL saliva bath containing pooled saliva stimulated from 8 healthy subjects for 1 hr to aid in pellicle formation as viewed through a microscope at 500× magnification.
3. Use an Oral-B® electric toothbrush (a product from the Procter & Gamble Company, Cincinnati, Ohio) or a flat-head manual toothbrush to apply a pea-sized amount (~1.2 g) of a toothpaste to the slab for 30 secs. Re-apply a second pea-sized amount of toothpaste to the same slab for 30 secs.
4. Place the slab in a dose cup containing 15 mL saliva bath for 1 hr. Rinse the slab with deionized water and capture an image of the slab at 500× magnification.
5. Repeat step 4 for 5 cycles.
6. Slab is rotated in a saliva bath for 16 hrs, then etched in 15 mL acid (i.e., Coca-Cola Classic drink from the Coca-Cola Company, Atlanta, Ga.) for 30 secs, 60 secs and 90 secs and imaged at 500× magnification for each time point.
7. Panelists are asked to evaluate the images for occlusion efficiency on a scale of 0 to 5 according to the Tubule Occlusion Score (TOS) scale set out in Table 3 herein below. Their assessments are recorded. Panelists are selected from individuals who are either trained to evaluate occlusion efficiency to the scales below in Table 3 or who have experience of occlusion efficiency evaluation in the oral care industry. The graded scores are then analyzed by one-way ANOVA.

TABLE 3

Tubule Occlusion Score

| Score | Occlusion |
|---|---|
| 0 | Etched slabs, no smear layer or tubule occulsion |
| 1 | Surface artifacts, >90% of tubules are open |
| 2 | Tubule are at least reduced in size or 50% are occluded |
| 3 | Most tubule are occluded, but the outline of the tubule are still visible |
| 4 | Most of the surface is fully covered by the smear layer, but some tubules are still visible |
| 5 | No open tubule are visible, the whole surface is covered by a smear layer |

Results

Figure 5:
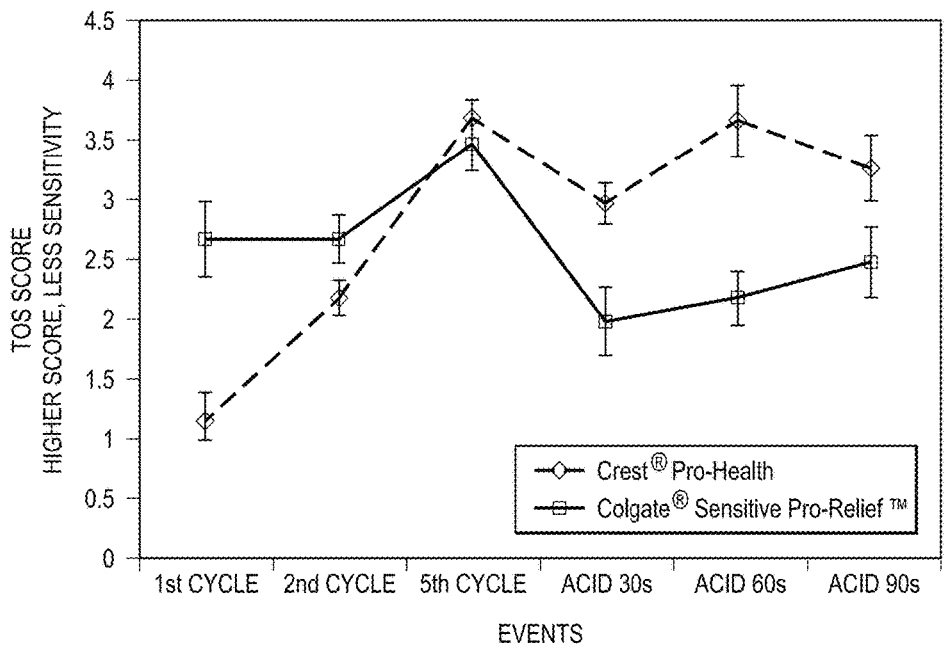
FIG. 5 provides the panel test results of tubule occlusion efficiency from the Tubule Occlusion Brushing Assay (TUBA) in Example 2 as a function of treatment since application of the toothpastes and post-acid challenges.

Crest® Pro-Health toothpaste and Colgate® Sensitive Pro-Relief™ Pro-Argin toothpaste are applied to the slabs in accordance with the protocol described above and a panel of 8 panelists evaluated their occlusion efficiency over 5 cycles, then at 30 secs, 60 secs and 90 secs post-acid challenge. Panelists are asked to score the images for occlusion efficiency on a scale of 0 to 5, wherein 0 represents no or poor tubule occlusion and 5 represents complete or very strong tubule occlusion. The results of the panel test are then averaged. FIG. 5 shows the results and confirms that the two toothpastes showed parity tubule occlusion efficiency during the 5 cycles. With continued reference to FIG. 5, Crest® Pro-Health toothpaste demonstrates statistically significant superior occlusion efficiency post-acid challenge vs. Colgate® Sensitive Pro-Relief™ Pro-Argin toothpaste that correlates to the same trend observed with Example 1. Therefore, the results correlate the demonstrative tool of the present invention to tubule occlusion efficiency performance, and thus can function as a reliable predictive tool for treatment effectiveness of tooth sensitivity, particularly dentin hypersensitivity.

Example 3—Clinical Anti-Sensitivity Test

Clinical Anti-Sensitivity Test (CAST) measures tooth sensitivity (Schiff Air Index) for differentiating and/or ranking the performance of oral care products for treating tooth sensitivity, particularly in reducing dentinal hypersensitivity. The present study compares the clinical reduction in the pain associated with hypersensitive dentin between two toothpastes: (i) Crest® Pro-Health (Lot #12041864CC, a product from the Procter & Gamble Company, Guangzhou, China) and (ii) Colgate® Sensitive Pro-Relief™ Pro-Argin (Lot #20100107BR1211, a product from the Colgate-Palmolive Company, New York, N.Y.). This study is a double-blinded, parallel-group, randomized clinical trial conducted according to the American Dental Association (ADA) Guidelines for the Acceptance of Products for the Treatment of Dentinal Hypersensitivity.

At the baseline visit, forty (40) healthy adult subjects (20 subjects per treatment group) with moderate dentinal hypersensitivity with a mean age of forty-six (46) years of age are enrolled in the study. To qualify for the study, subjects are required to have at least two sensitive teeth meeting the teeth sensitivity criteria of Schiff Air Sensitivity Scale score ≥2 at the baseline visit. The Schiff Air score is recorded according to the Schiff Air Index as set out below in Table 4.

TABLE 4

Schiff Air Index

| Score | Subject's Response |
|---|---|
| 0 | Tooth/subject did not respond to the air stimulus |
| 1 | Tooth/subject responded to the air stimulus but did not request discontinuation of the stimulus |
| 2 | Tooth/subject responded to the air stimulus and requested discontinuation or moved from the stimulus |
| 3 | Tooth/subject responded to the air stimulus, considered the stimulus to be painful and requested discontinuation of the stimulus |

Study subjects are assigned to one of two treatment groups: Crest® Pro-Health or Colgate® Sensitive Pro-Relief™ Pro-Argin. Both products are re-packed identically for blinding purposes. The study involves the following steps:
1. Study subjects are instructed to brush twice daily (morning and evening) for five times over 3 days only using their assigned toothpaste and a manual soft toothbrush. For each brushing event, study subjects are instructed to brush for a total cumulative brush time of two (2) minutes divided as follows: (i) first brush the two sensitive teeth for thirty (30) secs each tooth; and (ii) second brush the rest of the teeth for one (1) min.
2. Study subjects are then instructed to follow the brushing with slurry 1 time with 15 mL water for ten (10) secs.
3. After the fifth ($5^{th}$) brushing Schiff Air Sensitivity measurement are re-examined for the two (2) sensitive teeth.
4. After the re-examination, study subjects are instructed to swish 30 mL cold lemon juice (Lemon C100) for 1 min (i.e., $1^{st}$ Acid Challenge) and the Schiff Air Sensitivity measurement recorded.
5. Repeat step 4 (i.e., $2^{nd}$ Acid Challenge).

Results

Analysis of covariance (ANCOVA) with treatment as a factor and baseline Schiff Air Index score as the covariate are used to assess treatment differences at different events: (i) baseline, (ii) after the $5^{th}$ brushing, (iii) $1^{st}$ Acid Challenge, and (iv) $2^{nd}$ Acid Challenge. All comparisons are two-sided at the 0.05 level of significance. Lower scores on the Schiff Air Index indicate less tooth sensitivity. Baseline mean sensitivity score is 2.84 overall.

Figure 6:
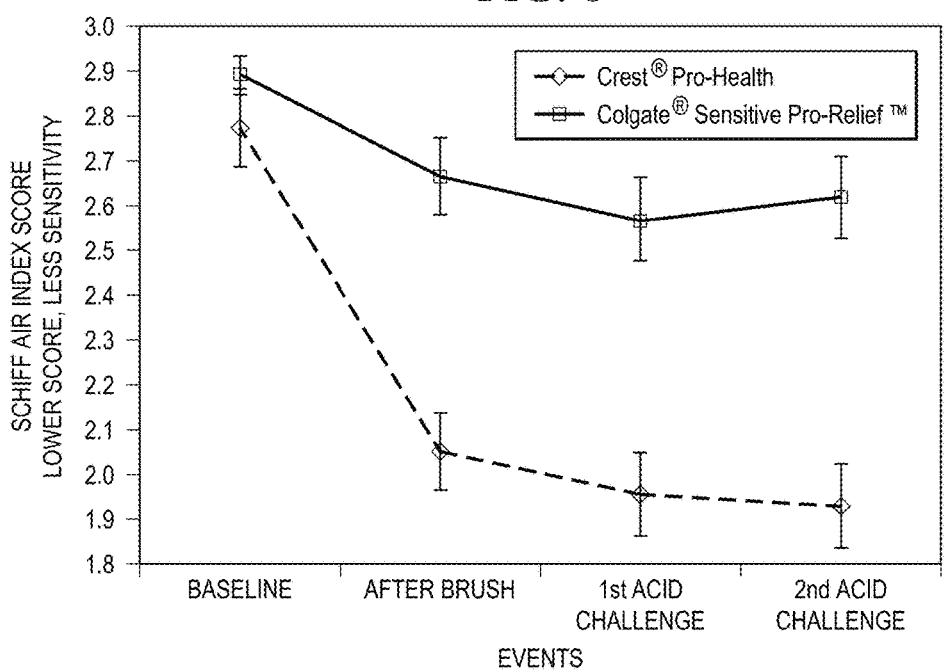
FIG. 6 provides the clinical test results of reduction in tooth sensitivity in Example 3 as measured by the Schiff Air Index score.

FIG. 6 shows the adjusted mean Schiff Air Index score for each toothpaste treatment and event. After the $5^{th}$ brushing event, the Schiff Air Index score is statistically lower (i.e., 22.44% reduction, $p<0.001$) for the Crest® Pro-Health treated group than that of the Colgate® Sensitive Pro-Relief™ Pro-Argin treated group. After the $1^{st}$ Acid Challenge, the Schiff Air Index score is statistically lower (i.e., 23.21% reduction, $p<0.001$) for the Crest® Pro-Health treated group than that of the Colgate® Sensitive Pro-Relief™ Pro-Argin treated group. After the $2^{nd}$ Acid Challenge, the Schiff Air Index score is statistically lower (i.e., 25.91% reduction, $p<0.001$) for the Crest® Pro-Health treated group than that of the Colgate® Sensitive Pro-Relief™ Pro-Argin treated group. The results demonstrate that Crest® Pro-Health provides superior sensitivity protection relative to Colgate® Sensitive Pro-Relief™ Pro-Argin, and correlates to the findings from the demonstration tool of the present invention in Example 1.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical limitations were expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for assessing treatment effectiveness of tooth sensitivity with an oral care product comprising:
   (a) a tooth shaped member comprising an outer layer simulating an enamel, wherein the outer layer at least partially covering an exterior surface of an inner layer simulating a pulp, and a liquid sensor contained either between the outer layer and inner layer, or within the inner layer; and
   (b) a plurality of holes, simulating open dentin tubules, configured through the outer layer to the inner layer, and in fluid communication with the liquid sensor wherein the holes have a diameter of from about 0.5 mm to about 5 mm;
      wherein the liquid sensor is configured to sense liquid passing through at least one of the plurality of holes as simulating the treatment effectiveness of tooth sensitivity of the oral care product;
      wherein at least a portion of the tooth shaped member is translucent or transparent; and
      wherein the liquid is an acidic solution.

2. The apparatus according to claim 1, wherein the holes have a length of from about 0.5 mm to about 10 mm.

3. The apparatus according to claim 1, wherein the liquid is an acidic solution having:
   (a) a concentration of from 0.5 mol/L to 6.0 mol/L of $H^+$ ions; and/or
   (b) a pH of about 5 or lower.

4. The apparatus according to claim 3, wherein the acidic solution is selected from the group consisting of lactic acid, acetic acid, citric acid, phosphoric acid, tartaric acid, and combinations thereof.

5. The apparatus according to claim 1, wherein the sensor, upon contact with the liquid, emits an electrical signal to an indicator, wherein the indicator performs at least one of the following responses: visual change, auditory change, odor change, or combinations thereof.

6. The apparatus according to claim 1, wherein the plurality of holes are positioned in a concave surface formed on the outer layer.

7. The apparatus according to claim 6, wherein the liquid pools on the concave surface (100).

8. An apparatus for assessing treatment effectiveness of dentin hypersensitivity using an oral care product, said apparatus comprising a tooth shaped member comprising at least an outer layer having an exterior surface and an opposing inner surface, and a plurality of holes traversing through the outer layer and simulating dentin tubules, wherein a liquid sensor on the inner surface is configured to sense liquid passing through at least one of the plurality of holes for assessing the treatment effectiveness of tooth sensitivity with the oral care product.

9. The apparatus according to claim 8, wherein the holes have a diameter of from about 0.5 mm to about 5 mm.

10. The apparatus according to claim 9, wherein the holes have a length of from about 0.5 mm to about 10 mm.

11. The apparatus according to claim 8, wherein at least a portion of the tooth shaped member is translucent or transparent.

12. An apparatus for assessing treatment effectiveness of tooth sensitivity with an oral care product comprising:
   (a) a tooth shaped member comprising an outer layer simulating an enamel, wherein the outer layer at least partially covering an exterior surface of an inner layer simulating a pulp, and a liquid sensor contained either between the outer layer and inner layer, or within the inner layer; and
   (b) a plurality of holes, simulating open dentin tubules, configured through the outer layer to the inner layer, and in fluid communication with the liquid sensor;
      wherein at least a portion of the tooth shaped member is translucent or transparent;
      wherein the liquid sensor is configured to sense liquid passing through at least one of the plurality of holes as simulating the treatment effectiveness of tooth sensitivity of the oral care product, and
      wherein the liquid is an acidic solution.

13. The apparatus according to claim 12, wherein the holes have a diameter of from about 0.5 mm to about 5 mm.

14. The apparatus according to claim 13, wherein the holes have a length of from about 0.5 mm to about 10 mm.

15. The apparatus according to claim 12, wherein the liquid is an acidic solution having:
   (c) a concentration of from 0.5 mol/L to 6.0 mol/L of $H^+$ ions; and/or
   (d) a pH of about 5 or lower.

16. The apparatus according to claim 15, wherein the acidic solution is selected from the group consisting of lactic acid, acetic acid, citric acid, phosphoric acid, tartaric acid, and combinations thereof.

17. The apparatus according to claim 12, wherein the sensor, upon contact with the liquid, emits an electrical signal to an indicator, wherein the indicator performs at least one of the following responses: visual change, auditory change, odor change, or combinations thereof.

18. The apparatus according to claim 12, wherein the plurality of holes are positioned in a concave surface formed on the outer layer.

19. The apparatus according to claim 18, wherein the liquid pools on the concave surface.

* * * * *